(12) United States Patent
Votour (10) Patent No.: US 9,654,377 B2
(45) Date of Patent: May 16, 2017

(54) PER PORT ETHERNET PACKET PROCESSING MODE BY DEVICE TYPE

(71) Applicant: THOMSON LICENSING, Issy de Moulineaux (FR)

(72) Inventor: Joe Gerald Votour, Carmel, IN (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 358 days.

(21) Appl. No.: 14/168,085

(22) Filed: Jan. 30, 2014

(65) Prior Publication Data

US 2015/0215430 A1    Jul. 30, 2015

(51) Int. Cl.
| | | |
|---|---|---|
| G06F 15/177 | (2006.01) | |
| H04L 12/701 | (2013.01) | |
| H04W 88/08 | (2009.01) | |
| H04L 12/801 | (2013.01) | |
| H04L 12/64 | (2006.01) | |
| H04L 29/12 | (2006.01) | |
| H04L 12/46 | (2006.01) | |
| H04L 12/24 | (2006.01) | |

(52) U.S. Cl.
CPC .......... *H04L 45/00* (2013.01); *H04L 12/6418* (2013.01); *H04L 47/10* (2013.01); *H04W 88/08* (2013.01); *H04L 12/46* (2013.01); *H04L 41/00* (2013.01); *H04L 61/2015* (2013.01)

(58) Field of Classification Search
CPC ..... H04L 45/00; H04L 12/6418; H04L 12/46; H04L 47/10; H04L 41/00; H04L 61/2015; H04W 88/08
See application file for complete search history.

(56) References Cited

U.S. PATENT DOCUMENTS

| | | | | |
|---|---|---|---|---|
| 6,639,917 | B1* | 10/2003 | Ellington, Jr. | .......... H04L 12/46 370/401 |
| 6,847,620 | B1* | 1/2005 | Meier | ................. H04L 12/4641 370/328 |
| 7,492,714 | B1* | 2/2009 | Liao | .................... H04L 12/4604 370/235 |
| 2008/0112408 | A1* | 5/2008 | Fan | ........................ H04L 49/354 370/389 |

* cited by examiner

*Primary Examiner* — Jonathan Bui
(74) *Attorney, Agent, or Firm* — Brian J. Dorini; Catherine A. Cooper (57) ABSTRACT

A method and apparatus for enabling software processing are described including receiving a dynamic host configuration protocol request form a client device, determining if the client device has a vendor specific identifier, determining a switch port to which the client device is connected, increasing a count of devices connected to the switch port, determining if the count is greater than a predetermined threshold and if the switch port is not already in software mode, placing the switch port in software mode if the count is greater than the predetermined threshold and if the switch port is not already in the software mode and saving the media access control address and the switch port to which the client device is connected.

11 Claims, 6 Drawing Sheets

PER PORT ETHERNET PACKET PROCESSING MODE BY DEVICE TYPE

FIELD OF THE INVENTION

The present invention is related to priority tagging and in particular, to adding or removing priority tags based on source and destination addresses.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

In server type devices, Ethernet traffic to and from certain devices (identified by MAC address) must be inspected. Packets destined to vendor devices must have IEEE 802.1Q/p headers added to them, packets from vendor devices to non-vendor device must have any IEEE 802.1Q/p headers removed. Since the hardware in the switch processor cannot fulfill those requirements, this packet inspection/modification must be done in software. Operating the switch ports in software mode has an impact on performance, decreasing bandwidth throughput.

In the past, it would be common practice to assign certain ports on the router/switch to be dedicated for the different purposes (e.g., certain ports are full speed and certain other ports have packet inspection/tagging). The disadvantage of this is that if the end-user has more devices than ports available, then the end-user requires extra equipment (e.g., switches).

SUMMARY OF THE INVENTION

In some instances it is necessary to be able to add or remove IEEE 802.1Q/p priority tags of packets based on the source and destination MAC addresses. The switch hardware in some equipment does not support this, so support has to be added to the software driver for the switch to implement adding or removing priority tagging. The software implementation lowers performance of the switch, so it was desirable to use software processing mode only when necessary.

A method and apparatus for enabling software processing are described including receiving a dynamic host configuration protocol request form a client device, determining if the client device has a vendor specific identifier, determining a switch port to which the client device is connected, increasing a count of devices connected to the switch port, determining if the count is greater than a predetermined threshold and if the switch port is not already in software mode, placing the switch port in software mode if the count is greater than the predetermined threshold and if the switch port is not already in the software mode and saving the media access control address and the switch port to which the client device is connected. A method and apparatus for disabling software processing are also described including receiving an indication that a dynamic host configuration protocol lease for a client device has expired or has not been renewed, determining if the client device has a vendor specific identifier, determining a switch port to which the client device is connected, decreasing a count of devices connected to the switch port, determining if the count is less than a predetermined threshold and placing the switch port in hardware mode if the count is less than the predetermined threshold. Also described are a method and apparatus for communications within a local area network including determining if data is from a non-vendor device, determining if the data is destined for a non-vendor device, if the data is from a non-vendor device, first adding an IEEE 802.1Q virtual local area network priority tag and forwarding the data, if the data is not destined for a non-vendor device, determining if the data is destined for a non-vendor device, if the data is not from a non-vendor device, removing the IEEE 802.1Q virtual local area network priority tag and forwarding the data, if the data is destined for a non-vendor device and second adding a VID=0 if the IEEE 802.1Q virtual local area network priority tag does not exist and the data is not destined for a non-vendor device.

BRIEF DESCRIPTION OF THE DRAWINGS

The present invention is best understood from the following detailed description when read in conjunction with the accompanying drawings. The drawings include the following figures briefly described below:

FIG. 3 shows IEEE 802.1p Priority and Differentiated Service Code Point (DSCP) tagging.

DETAILED DESCRIPTION OF THE PREFERRED EMBODIMENTS

The Broadband Home Router (BHR) is able to determine which switch port (Ethernet ports 1-4, Multimedia over Cable Alliance (MoCA) or wireless) a device is connected to by inspecting the MAC address to physical port mapping in the switch table. A vendor specifies which devices are vendor devices by a special identifier passed during the Dynamic Host Configuration Protocol (DHCP) process. Switch ports that have vendor devices assigned to them get put into software processing mode, where the Ethernet packets are examined, and modified if necessary. Switch ports that do not have vendor devices connected remain in hardware mode (the switch hardware routes the packets), allowing the packets to pass traffic at full-speed.

Experiments conducted indicated that switch ports in hardware mode ran at full-speed (900+Mbps on a Gigabit link) and ports in software mode ran much slower (between about 200-420 Mbps on a Gigabit link).

Figure 1:
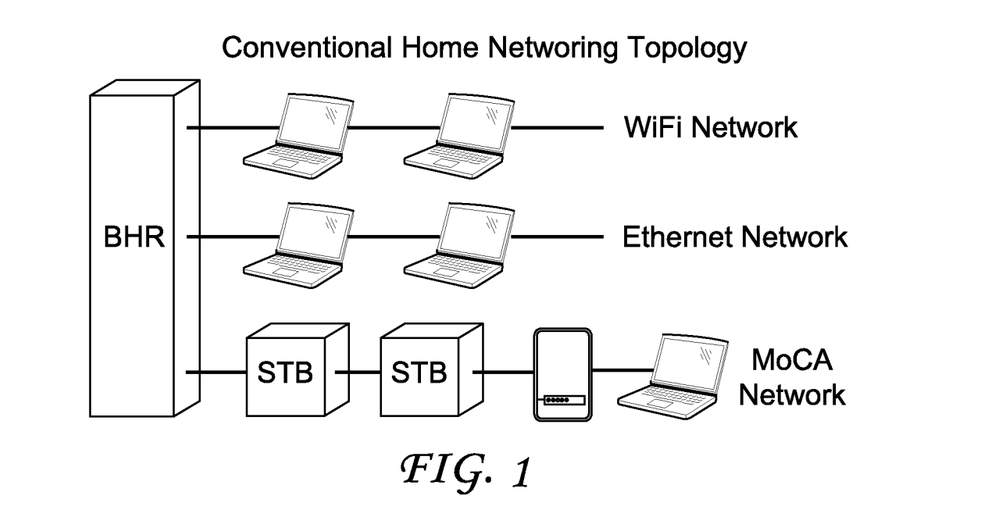
FIG. 1 is a schematic diagram of a conventional home networking topology.

FIG. 1 is a schematic diagram of a conventional home networking topology. In FIG. 1 the BHR is connected to paired set top boxes (STBs) which are connected to a MoCA network. Additional devices may be connected to the MoCA network via the use of ECB (Ethernet to Coaxial Bridge) devices. User can be connected to an Ethernet network, a WiFi network or a MoCA network or any combination of these networks.

Figure 2:
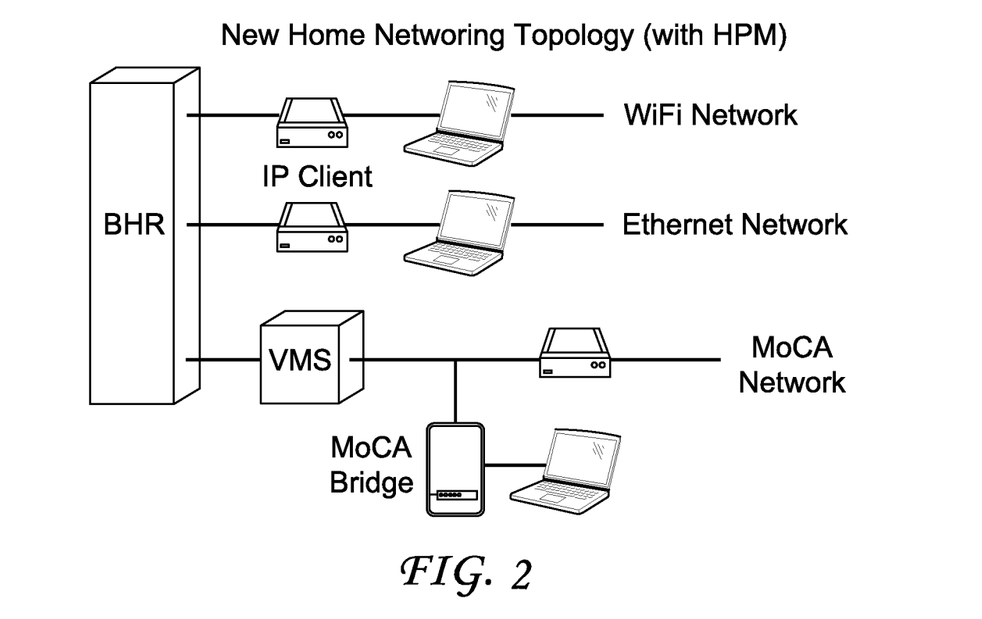
FIG. 2 is a schematic diagram of a home networking topology in accordance with the principles of the present invention.

FIG. 2 is a schematic diagram of a home networking topology in accordance with the principles of the present invention. In FIG. 2 the BHR is connected to a Media Server (MS) which is connected to a MoCA network. That is, the first STB is replaced with a MS and subsequent STBs are replaced with Media Clients (MCs) labeled as IP Clients. PC and/or Xboxes are able to interact with the MS. The MS/MC (IP Client) combination allows the MS to store content in a single location and play the content back to multiple MCs (IP Clients). Rather than adding more bandwidth, some service providers (content providers, vendors) are focusing on media delivery including Live TV, Video on Demand and PVR. In this case, it is imperative that this media be delivered without interruption even though the network may be saturated with other data. The MS and MC can now be located on interfaces other than MoCA, which necessitates traffic prioritization on all interfaces.

Packet tagging will be performed on all BHR interfaces including Ethernet (LAN and WAN), MoCA (LAN and WAN) and WiFi. Packets will be classified into one of three queues:

High: System/Control messages (e.g., start a Video on Demand (VoD) stream)
Medium: Video stream
Low/Best Effort: Everything else, including user (non-VZ traffic)

There are two methods of tagging packets:
IEEE 802.1p (Ethernet frame)
DSCP (IP header)

Within the LAN (Home Network), IEEE 802.1p priority tagging is used to classify the packets into the High/Medium/Low queues (where possible). When packets enter or exit the Home Network, IEEE 802.1p data is stripped, so that information is placed into the Differentiated Services Code Point (DSCP) field of the IP header, where it may be used to recreate IEEE 802.1p priority tags at a later time.

FIG. 3 shows IEEE 802.1p Priority and Differentiated Service Code Point (DSCP) tagging. IEEE 802.1p and DSCP Class Selectors have 7 priorities (0 is Lowest, 7 is Highest). DSCP has many more priorities, but only the Class Selectors map natively to IEEE 802.1p without extra predefined translations. Routers and switches are supposed to honor these priorities and send traffic in an order based on them but this is not always the case with DSCP. It depends on network administrator. The BHR has three priority queues:

Low: Priorities 0-3
Medium: Priorities 4,5
High: Priorities 6,7

The Home Network Policy Manager (HPM) is a feature that allows traffic to be prioritized based on the destination of said traffic. Due to the limited amount of bandwidth in the network (both the home network, as well as the vendor network), it is desired that vendor devices can send messages (e.g. initiate a VoD, change channel, etc.) that do not get drowned out by other network traffic (e.g. BitTorrent, FTP, etc.) Traffic to/from vendor devices (e.g. MS, IP Client) in general receives higher priority than traffic sent to/from non-vendor devices.

In the HPM of the present invention existing IEEE 802.1p priority tags will be used for sending the packet via the correct queue. Traffic originating from the vendor (service provider, content provider) network (WAN) will have an IEEE 802.1p priority tag created from the DSCP priority tag, if destined to a vendor (content provider, service provider) device on the LAN. Traffic from vendor devices in the home network (LAN) destined for the vendor network (WAN) will have a DSCP priority tag created from the IEEE 802.1p priority tag. Within the LAN, traffic that is destined for a vendor device will have IEEE 802.1p priority tags created from the DSCP priority tag and traffic destined for a non-vendor device will have IEEE 802.1p priority tags removed, if IEEE 802.1p priority tags are present. Packet tagging code is in a software bridge module for LAN to LAN, LAN to WAN and WAN to LAN priority tagging.

The hardware switch presently in use (BCM6819) does not support the necessary priority tagging functionality. Packets must be modified in software before being passed to the switch. The LAN to performance drops from 900 Mbps to ~420 Mbps. The LAN to WAN performance drops as well. If not for the IEEE 802.1p priority tag stripping, the hardware switch could be run in hardware switch mode on ports without vendor devices connected to the network.

Within the home network (LAN), vendor devices send IEEE 802.1Q VLAN-tagged traffic with a VLAN ID of 0 and IEEE 802.1p bits set to the desired priority. Non-vendor devices send traffic that is not IEEE 802.1Q VLAN-tagged, therefore not having the IEEE 802.1p priority set. This traffic is treated as "best-effort" and thus is generally of lower priority than the vendor VLAN-tagged traffic. The three vendor queues (high/medium/low) for sending traffic correspond to the IEEE 802.1p priorities in the following way:

| IEEE 802.1p Priority | Queue |
| --- | --- |
| 0 (Best Effort) | Low |
| 1 | Low |
| 2 | Low |
| 3 | Low |
| 4 | Medium |
| 5 (Video) | Medium |
| 6 | High |
| 7 (Command channel) | High |

Additionally, because non-vendor devices can send/receive traffic to/from vendor devices, there is further packet inspection/handling that must be performed. Non-vendor devices are assumed to not be able to handle IEEE 802.1Q VLAN-tagged traffic, so the VLAN headers must be stripped when sending traffic from a vendor device to a non-vendor device. When sending traffic to a vendor device, a non-vendor device sends traffic containing a priority in the DSCP/Terms of Service (ToS) byte (in the IP header) and that traffic will get an IEEE 802.1Q VLAN header added with VLAN ID of 0, and IEEE 802.1p bits created from the DSCP/ToS byte.

Within its network, the vendor prioritizes traffic and presents it to the BHR on the WAN port with a priority set in the DSCP/ToS byte of the IP header. When this traffic is destined for a vendor device inside the LAN, the DSCP/ToS byte will be converted into an IEEE 802.1Q/p VLAN tag.

Furthermore, in order to ensure that the priority is correctly forwarded from the LAN to WAN (vendor network), traffic from vendor devices will have the IEEE 802.1Q/p VLAN tags converted into a DSCP/ToS priority in the IP header when the traffic exits via the WAN port.

Vendor devices (e.g., MS, MC) will transmit (send) a DHCP request containing DHCP option 60 (Vendor Class Identifier) with a value of "IP-STB". These devices will receive an IP address in the vendor-reserved range of 192.168.1.100 to 192.168.1.150. Since the vendor-reserved address range is 51 IP addresses, there may be up to 51 devices that will have traffic tagged per the HPM rules.

Traffic to and from devices on this port will have VLAN tags applied or stripped based on the criteria described below.

When the DHCP leases for all vendor devices on that port expire then traffic to and from devices on that port will no longer be processed for tagging.

The implementation for this is in the Host Manager and HPM modules. Upon receiving a DHCP option 60 for a device that does not currently have a lease (via a MBus event), the port that the device is connected to is determined by the Host Manager. Processing in the HPM module will then manage reference counts and if necessary place the switch port in software mode. When the lease is removed for the device (either via releasing the lease or allowing it to timeout), the MBus event is intercepted and code within the HPM module determines if, and if necessary, places the switch port back in hardware mode.

All packets from a non-vendor to a vendor device or a vendor device to a non-vendor device must be inspected to see if they need modifications made (VLAN tags added or stripped). The switch hardware in the Broadcom 6819 System on Chip (SoC) which does not support this, so all of the packet inspection/modifications must be performed with the switch in full software mode.

This applies only to switch ports that have vendor devices connected to them (as identified by DHCP option 60). Switch ports without vendor devices connected to them will remain in the default hardware mode. This means that packets sent to devices on these switch ports cannot be inspected or modified. Switch ports with vendor devices are put into software mode using the equivalent of the Command Line Interface (CLI) command ":eth bridge ifconfig prioconfig increase".

In LAN to LAN traffic when a vendor device is connected to a switch port, the switch is in software mode, allowing all traffic on that port to be inspected and (if necessary) modified before being DMAed to the switch. Below is a summary of the rules that are used for traffic tagging depending on the origin and destination of the traffic:

| Source | Destination | Action |
| --- | --- | --- |
| Non-vendor device | Non-vendor device | IEEE 802.1Q VLAN tag is stripped, DSCP/ToS byte in IP header is not modified |
| Non-vendor device | Vendor device | IEEE 802.1Q VLAN tag (VID 0) is added, 802.1p priority is generated from upper three bits of DSCP/ToS byte in IP header |
| Vendor device | Non-vendor device | IEEE 802.1Q VLAN tag is stripped, DSCP/ToS byte in IP header is not modified |
| Vendor device | Vendor device | IEEE 802.1Q VLAN tag is not modified. If one does not exist, then IEEE 802.1Q VLAN tag (VID 0) is added, 802.1p priority is generated from upper three bits of DSCP/ToS byte in IP header |

Multicast traffic, except Simple Service Discovery Protocol (SSDP) (MAC address 01:00:5E:7F:FF:FA) will be tagged according to the table above (so, only if it is to a vendor device). Broadcast traffic will not be tagged.

It is important to note that when the packet enters the soft-bridge code (and possibly earlier and/or later in the process), it may be VLAN tagged even if it was not sent as VLAN tagged. At some stage, the packets may get an IEEE 802.1Q VLAN tag with VLAN ID of 1 added, and this tag will (eventually) get stripped. Additionally, it is possible that that even when the VLAN ID is 0 that it gets stripped. In this event, then the VLAN tag would get recreated with the DSCP/ToS value. The packet tagging/stripping is done in the switch driver code.

In wireless traffic, there is currently no special support for wireless traffic; implementing these rules requires changes to the WiFi driver. When transmitting from the BHR to a wireless device, the VLAN tag appears to be included in the packet (when captured with Air Packet Capture (AirPcap)). Transmitting from a wireless device to the BHR has the Wireless MultiMedia Extensions (WMM) value set according to the VLAN priority, but the VLAN tag is stripped off upon reaching the BHR.

In LAN to WLAN traffic, the existing label/connections architecture was extended to handle the conversion of IEEE 802.1Q/p VLAN priorities to DSCP/ToS conversions. This is accomplished by adding a new precedence flag, "upstr-from_intclass", which will in combination with "tosmarking=enabled" overwrite the ToS byte with the value from the IEEE 802.1Q/p priority bytes.

This was implemented for both the Accelerated IP (AIP) and non-accelerated traffic cases. This is only performed for traffic coming from IP addresses in the vendor device range as handed out by DHCP option 60—192.168.1.100 to 192.168.1.150. Traffic from all other IP addresses does not get modified in this fashion.

Traffic from WAN to LAN gets tagged according to the rules of LAN to LAN.

Statistics for HPM are available via both the CLI and TR-69. TR-69 is a protocol that allows the management of routers. One important thing to note is that it is not possible to monitor all priority queues at the same time (this is a BCM6819 restriction). The priority queue to monitor (Low/Medium/High) must be selected prior to receiving traffic for that priority and it applies to all switch ports. The statistics are obtained by reading the BCM6819 hardware registers and reported by either the CLI or MBus.

The HPM statistics can be accessed via the CLI command: :hpm stats

There are three subcommands:

| Subcommand | Action |
| --- | --- |
| report | Displays the statistics for all Ethernet/MoCA LAN switch ports |
| clear | Resets the statistics for all Ethernet/MoCA LAN switch ports to 0 |
| priority | Changes the priority queue to monitor (Low/Medium/High) |

Examples

Display all counters for all Ethernet/MoCA LAN switch ports:
:hpm stats report
Clear (reset) the counters for all Ethernet/MoCA LAN switch ports:
:hpm stats clear
Monitor High priority queue:
:hpm stats priority priority High The HPM statistics/configuration can be accessed via TR-69. Similar to the CLI, it is only possible to monitor one priority queue at a time across all switch ports, therefore the priority to monitor must be set prior to receiving traffic for that priority.

Figure 4:
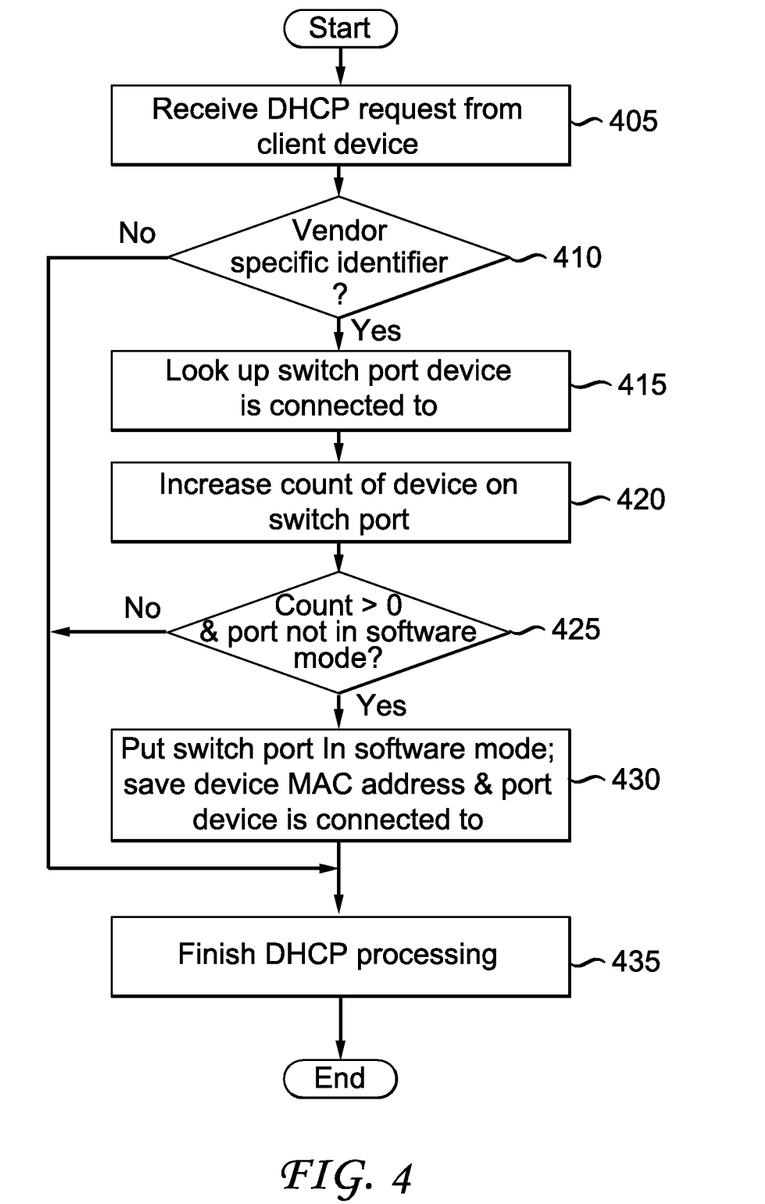
FIG. 4 is a flowchart of an exemplary process to enable software processing in accordance with the principles of the present invention.

FIG. 4 is a flowchart of an exemplary process to enable software processing in accordance with the principles of the present invention. At 405 the Home Manager of the BHR receives a DHCP request from a client device. At 410 a test is performed to determine if the client device is a vendor specific device. This is accomplished by checking the identifier against a range of vendor specific identifiers. If the identifier is vendor specific then at 415 look up the switch port device is connected to. If the identifier is not vendor specific then processing proceeds to 435. At 420, the count of devices on the switch port is increased. At 425 a test is performed to determine if the count is greater than 0 and the port is not in software mode. If the count is greater than 0 and the port is not in software mode then at 430, the switch is put in software mode and the MAC address and the port it is connected to are saved. If the count is not greater than 0 or the port is already in software mode then processing proceeds to 435. At 435 DHCP processing continues.

Figure 5:
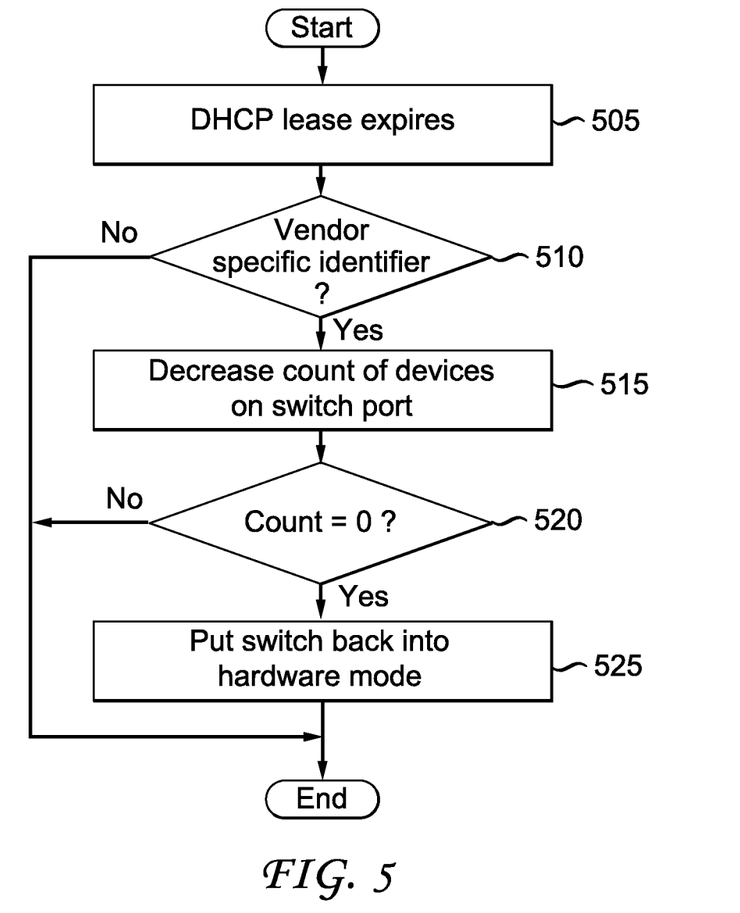
FIG. 5 is a flowchart of an exemplary process to disable software processing in accordance with the principles of the present invention.

FIG. 5 is a flowchart of an exemplary process to disable software processing in accordance with the principles of the present invention. At 505 the DHCP lease expires or is not renewed. At 510 a test is performed to determine if the device is vendor specific. If the device is vendor specific then at 515 the count of devices on the switch port is decreased. If the device is not vendor specific then processing ends. At 520 a test is performed to determine if the count is 0. If the count is 0 then at 525 the switch that the port is associated with is put back into hardware mode. If the count does not equal 0 then processing ends.

Figure 6:
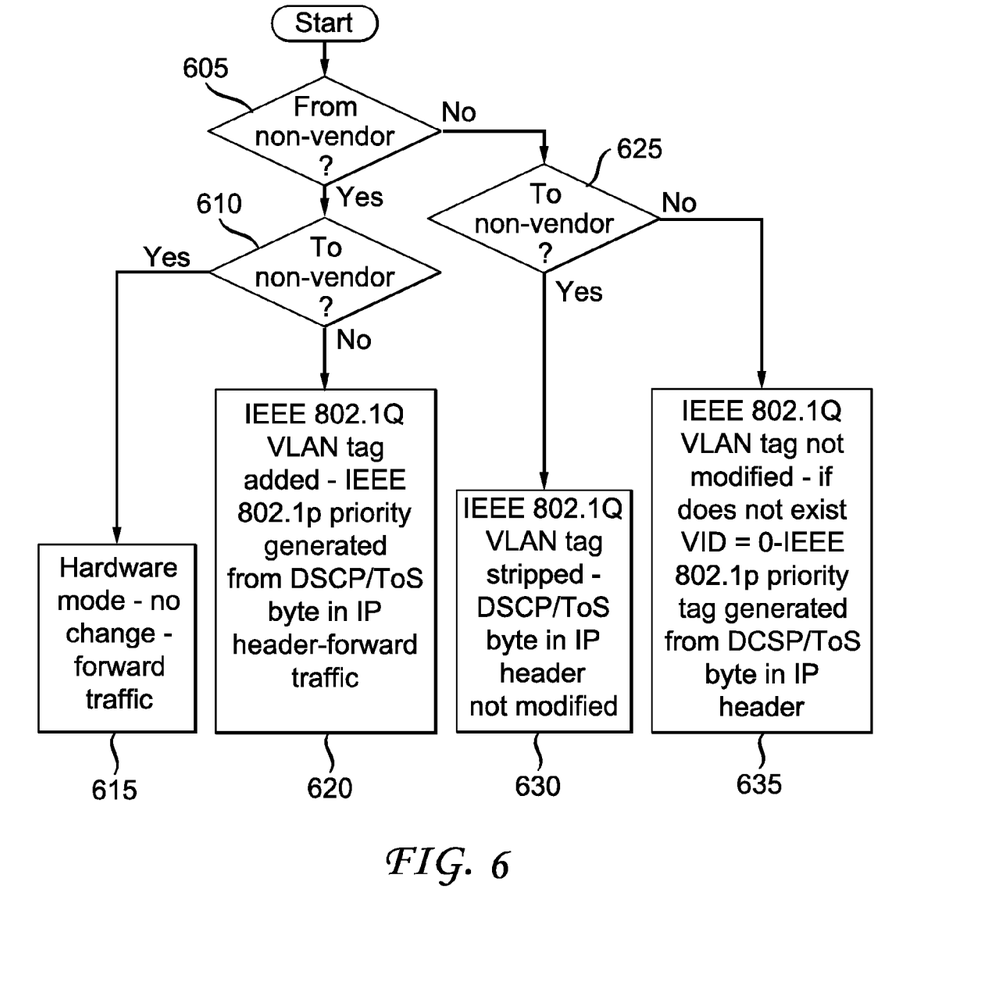
FIG. 6 is a flowchart of an exemplary software process for processing LAN-LAN traffic (data) in accordance with the principles of the present invention.

FIG. 6 is a flowchart of an exemplary software process for processing LAN-LAN traffic (data) in accordance with the principles of the present invention. At 605 a test is performed to determine if the traffic (data, content) is from a non-vendor device. If the traffic is from a non-vendor device then at 610 a test is performed to determine if the traffic (data, content) is being transmitted to a non-vendor device. If the transmission is to a non-vendor device then at 615 the traffic is transmitted with the switch in hardware mode so there is no change. If the transmission is not to a non-vendor device then at 620 an IEEE 802.1Q VLAN tag is added. The IEEE 802.1p priority generated from the DSCP/ToS byte in the IP header. If the traffic (data, content) is not from a non-vendor device then at 625 a test is performed to determine if the traffic (data, content) is being transmitted to a non-vendor device. If the traffic (data, content) is being transmitted to a non-vendor device then at 630 the IEEE 802.1Q VLAN tag is stripped. The DSCP/ToS byte in the IP header is not modified. If the traffic (data, content) is not being transmitted to a non-vendor device then at 635 the IEEE 802.1Q VLAN tag is not modified. If the IEEE 802.1Q VLAN tag does not exist then VID is set to 0. The IEEE 802.1p priority tag is generated from the DSCP/ToS byte in the IP header.

When the traffic (data, content) is from the LAN to the WAN and from a vendor device then the DSCP priority tag is created from the IEEE 802.1Q/p priority tag. When the traffic (data, content) is from the WAN to the LAN and to a vendor device then the DSCP/ToS byte is converted to an IEEE 802.1Q/p VLAN tag.

Figure 7:
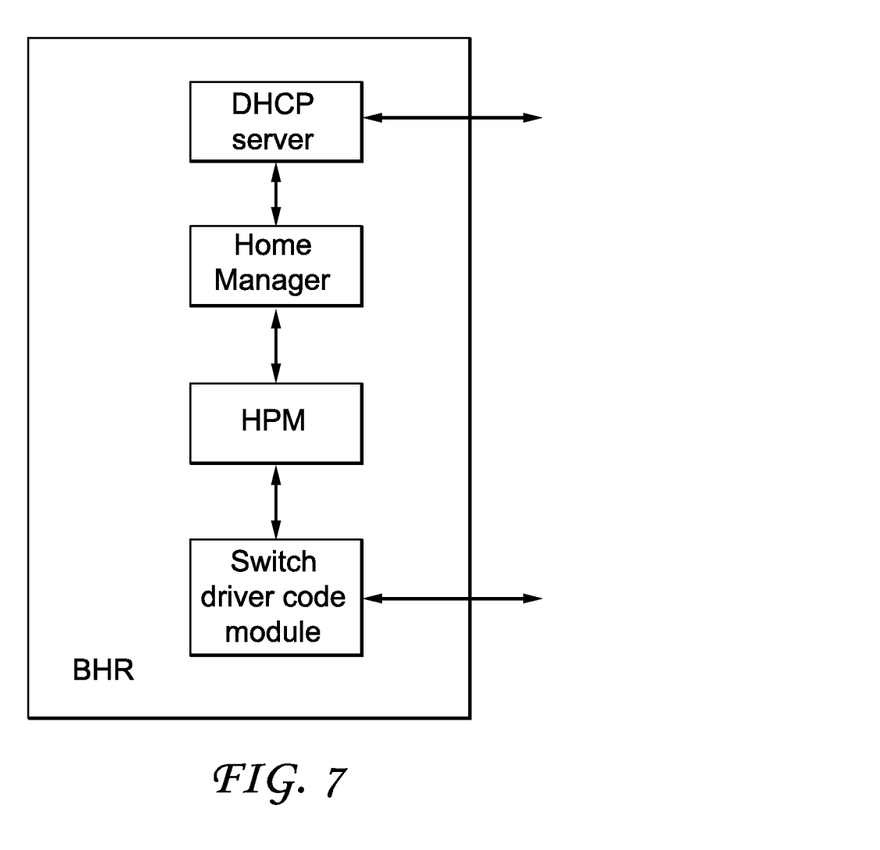
FIG. 7 is a block diagram of an exemplary implementation of the BHR in accordance with the principles of the present invention.

FIG. 7 is a block diagram of an exemplary implementation of the BHR in accordance with the principles of the present invention. The BHR includes a number of modules. The DHCP server module receives DHCP messages from clients on the LAN. The Home Manager receives the messages from the DHCP server and determines if the device is a vendor device. The HPM references the switch counts and places the switch in software mode if necessary. The switch driver code module is activated when the switch is placed in software mode and handles the processing of traffic (data, content) when the switch is in software mode.

It is to be understood that the present invention may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for communications within a local area network, said method comprising:

determining if data is from a non-vendor device based on whether said data does not contain a vendor specific identifier, wherein a vendor device is associated with said vendor specific identifier;

adding a network priority tag to a header of said data and forwarding said data, if said data is destined for a vendor device and said data is from a non-vendor device;

removing an existing network priority tag from the header of said data and forwarding said data, when said data is destined for a non- vendor device and said data is determined to be from a vendor device and when said network priority tag exists in said header of said data; and adding a network identifier if said network priority tag does not exist and said data is destined for said vendor device and said data is from said vendor device.

2. The method according to claim 1, wherein said first and said second adding steps further comprise generating a priority from a Differentiated Services Code Point field and Terms of Service byte in an IP header.

3. The method according to claim 1, wherein said network priority tag is
an IEEE 802.1Q virtual local area network priority tag.

4. The method according to claim 1, wherein said network identifier is an IEEE 802.1Q tag.

5. The method according to claim 1, wherein said network identifier is set to 0.

6. An apparatus for communications within a local area network, comprising:
- a switch, said switch having a switch driver, said switch driver being activated when said switch is placed in software mode, said switch driver determining if data is from a non-vendor device based on whether said data does not contain a vendor specific identifier, wherein a vendor device is associated with said vendor specific identifier;
- said switch driver adding a network priority tag to a header of said data and forwarding said data, if said data is destined for a vendor device and said data is from a non-vendor device;
- said switch driver removing an existing network priority tag from the header of said data and forwarding said data, when said data is destined for a non-vendor device and said data is determined to be from a vendor device and when said network priority tag exists in said header of said data; and
- said switch driver adding a network identifier if said network priority tag does not exist and said data is destined for said vendor device and said data is from said vendor device.

7. The apparatus according to claim 6, wherein said first and said second adding of said switch driver further comprise generating, by said switch driver, a priority from a Differentiated Services Code Point field and Terms of Service byte in an IP header.

8. The apparatus according to claim 6, wherein said network priority tag is an IEEE 802.1Q virtual local area network priority tag.

9. The apparatus according to claim 6, wherein said network priority tag is an IEEE 802.1Q virtual local area network priority tag.

10. The apparatus according to claim 6, wherein said network identifier is an IEEE 802.1Q tag.

11. The apparatus according to claim 6, wherein said network identifier is set to 0.

* * * * *